(12) United States Patent
Kim (10) Patent No.: US 10,124,456 B2
(45) Date of Patent: Nov. 13, 2018

(54) ROTARY TABLE

(71) Applicant: DOOSAN MACHINE TOOLS CO., LTD., Changwon-si, Gyeongsangnam-do (KR)

(72) Inventor: Jong Bong Kim, Changwon-si (KR)

(73) Assignee: DOOSAN MACHINE TOOLS CO., LTD., Changwon-si, Gyeongsangnam-do (KR)

( * ) Notice: Subject to any disclaimer, the term of this patent is extended or adjusted under 35 U.S.C. 154(b) by 0 days.

(21) Appl. No.: 15/472,207

(22) Filed: Mar. 28, 2017

(65) Prior Publication Data

US 2017/0283190 A1  Oct. 5, 2017

(30) Foreign Application Priority Data

Mar. 29, 2016  (KR) ........................ 10-2016-0037342

(51) Int. Cl.

| | |
|---|---|
| *B23Q 16/10* | (2006.01) |
| *B23Q 16/08* | (2006.01) |
| *B23Q 1/25* | (2006.01) |
| *B23Q 16/02* | (2006.01) |
| *B23Q 1/44* | (2006.01) |
| *B23Q 16/06* | (2006.01) |
| *B23Q 1/26* | (2006.01) |

(Continued)

(52) U.S. Cl.
CPC ............... *B23Q 16/10* (2013.01); *B23Q 1/25* (2013.01); *B23Q 1/26* (2013.01); *B23Q 1/44* (2013.01); *B23Q 16/026* (2013.01); *B23Q 16/06* (2013.01); *B23Q 16/083* (2013.01); *B65G 29/00* (2013.01); *B65G 47/8807* (2013.01); *B23Q 2220/004* (2013.01)

(58) Field of Classification Search
CPC ...... B65G 29/00; B65G 47/8807; B23Q 1/25; B23Q 1/26; B23Q 1/44; B23Q 16/026; B23Q 16/06; B23Q 16/083; B23Q 16/10; B23Q 2220/004
USPC ....... 198/345.3, 377.1, 469.1, 478.1; 269/57, 269/63, 66; 74/816
See application file for complete search history.

(56) References Cited

U.S. PATENT DOCUMENTS 2,796,776 A * 6/1957 Locke, Sr. ............. B23Q 16/06
418/34
5,440,952 A * 8/1995 Nakashima .......... B23Q 16/102
198/345.3

(Continued)

FOREIGN PATENT DOCUMENTS

| CN | 101722442 A | 6/2010 |
|---|---|---|
| CN | 204248497 U | 4/2015 |
| KR | 10-2013-0014722 A | 2/2013 |

OTHER PUBLICATIONS

Chinese Office Action dated Jul. 23, 2018, issued in corresponding Chinese Patent Application No. 201710195150.6.

*Primary Examiner* — Leslie A Nicholson, III
(74) *Attorney, Agent, or Firm* — Hauptman Ham, LLP (57) ABSTRACT

A rotary table according to the exemplary embodiment of the present disclosure includes a piston 70 having a first tapered portion 72, and a clamp 80 having a second tapered portion 82. When the first tapered portion 72 comes into close contact with the second tapered portion 82 by a movement of the piston 70, a pallet base 30 is fixed to a table base 10, and thus the pallet base 30 is rotated, thereby maintaining a preset posture.

5 Claims, 8 Drawing Sheets

(51) Int. Cl.
*B65G 29/00* (2006.01)
*B65G 47/88* (2006.01)

(56) References Cited

U.S. PATENT DOCUMENTS

| | | | |
|---|---|---|---|
| 7,014,033 B2* | 3/2006 | Sticht | B65G 35/06 198/345.3 |
| 8,448,543 B2* | 5/2013 | Tatsuda | B23Q 16/102 269/57 |
| 2010/0019427 A1* | 1/2010 | Nishida | B23Q 16/06 269/74 |

* cited by examiner

<Prior Art>

FIG. 1

<Prior Art>

FIG. 2

<Prior Art>

ROTARY TABLE

CROSS-REFERENCE TO RELATED APPLICATIONS

This application claims benefit and priority to Korean Patent Application No. 10-2016-0037342, filed on Mar. 29, 2016, with the Korean Intellectual Property Office, the disclosure of which is incorporated herein in its entirety by reference.

TECHNICAL FIELD

The present disclosure relates to a rotary table, and more particularly, to a rotary table which allows a pallet base to stop rotating at a particular position of a table base.

BACKGROUND

In general, a rotary table includes a clamping structure which allows a pallet base to rotate on a table base and stop rotating at a particular position. A pallet may be mounted on the pallet base, and a workpiece may be mounted on the pallet.

A machine tool cuts the workpiece. In more detail, it is necessary to change a direction of the workpiece so that a cutting tool of the machine tool approaches the workpiece. That is, the rotary table operates to rotate the pallet and the pallet base so that the workpiece is placed in a direction appropriate for the cutting processing.

Meanwhile, a rotational displacement of the rotary table may be numerically controlled by a servo motor, thereby having an ability of precisely dividing an angle. As the ability of dividing an angle is improved, a posture of the pallet base may be changed with a very small angular displacement, such that it is possible to machine the workpiece into a complicated shape. To implement an effect of the ability of dividing an angle, the pallet base needs to be fixed to the table base, and is not to be moved during the cutting processing.

The rotary table has a clamping structure for fixing the pallet base to the table base.

Figure 1:
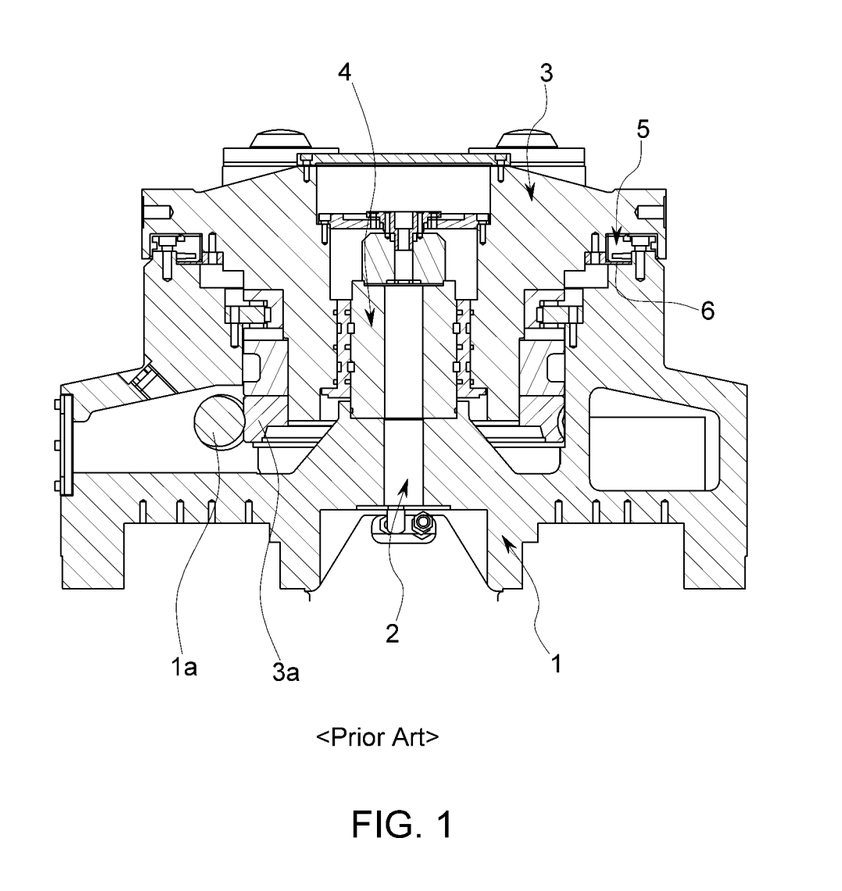
FIG. 1 is a view for explaining a rotary table in the related art.

The rotary table and the clamping structure in the related art will be described with reference to the attached FIG. 1. FIG. 1 is a view for explaining the rotary table in the related art.

The rotary table in the related art may include a table base 1, a center shaft 2, a pallet base 3, a joint 4, a clamp 5, and a friction pad 6.

The table base 1 has a worm shaft 1a, and the worm shaft 1a may be operated by a servo motor.

The center shaft 2 may be disposed to stand at a center of the table base 1.

The pallet base 3 is rotatably installed on the center shaft 2. Further, a worm wheel 3a is provided at a lower side of the pallet base 3, and the worm wheel 3a is gear-engaged with the worm shaft 1a. That is, when the worm shaft 1a rotates, the worm wheel 3a rotates, and thus the pallet base 3 may rotate.

The joint 4 is provided between the center shaft 2 and the pallet base 3. Further, the joint 4 enables pressurized oil to be delivered from the center shaft 2 to the pallet base 3.

The clamp 5 is disposed between the table base 1 and the pallet base 3, and fixed to the table base 1. Further, the clamp 5 may be supplied with pressurized oil from the table base 1.

The friction pad 6 is disposed between the clamp 5 and the table base 1, and fixed to the pallet base 3.

When the pressurized oil is provided to the clamp 5, the clamp 5 is expanded, and the friction pad 6 is suppressed. Further, as the friction pad 6 is suppressed, the pallet base 3 is suppressed.

Meanwhile, a bearing unit is provided between the table base 1 and the pallet base 3. The bearing unit enables the pallet base 3 to smoothly rotate on the table base 1.

Figure 2:
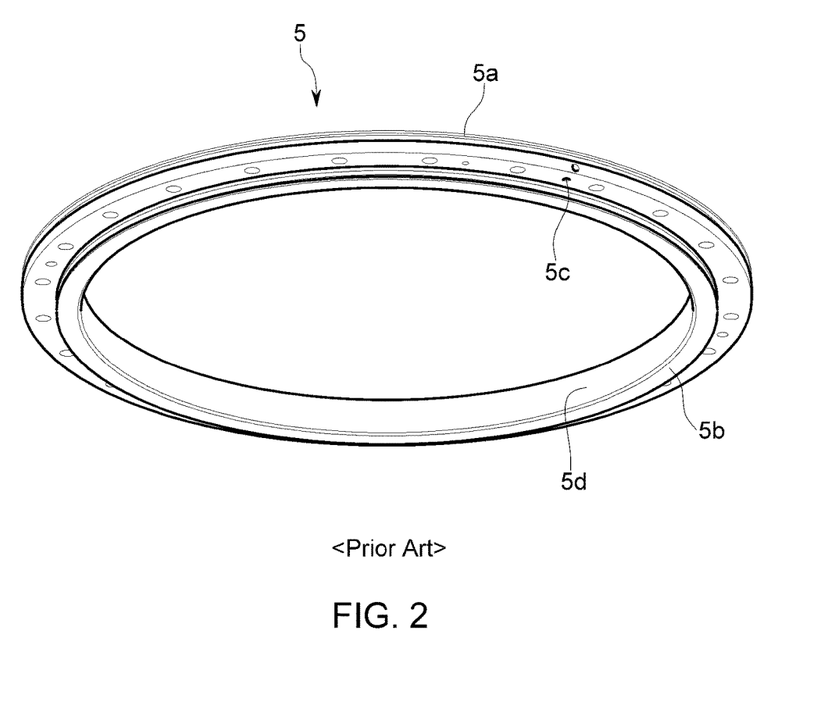
FIGS. 2 and 3 are a perspective view and a cross-sectional view for explaining the clamp on the rotary table in the related art.
Figure 3:
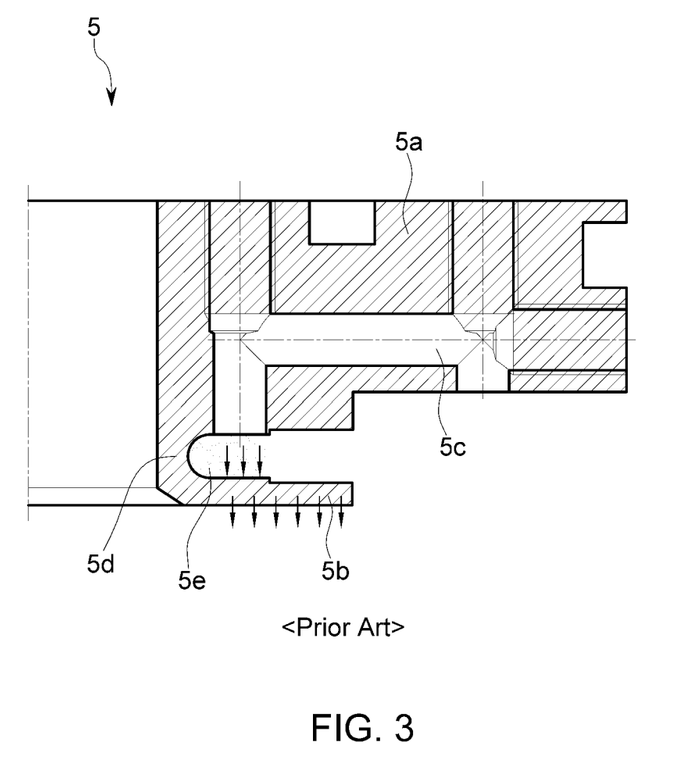

A configuration of the clamp 5 will be described in more detail with reference to the attached FIGS. 2 and 3. FIGS. 2 and 3 are a perspective view and a cross-sectional view for explaining the clamp on the rotary table in the related art.

The clamp 5 has a ring shaped clamp body 5a, and a flange 5b is formed at a lower side of the clamp body 5a by means of a connecting portion 5d. That is, a chamber 5e is formed by the clamp body 5a, the flange 5b, and the connecting portion 5d. In addition, a flow path 5c is formed in the clamp 5, and the flow path 5c is formed to be connected from the table base 1 to the chamber 5e.

Meanwhile, a packing may be provided in the chamber 5e, and thus the chamber 5e has a sealed structure. Further, the friction pad 6 may be disposed to be in contact with the flange 5b.

Therefore, when the pressurized oil is provided to the clamp 5 through the flow path 5c, pressure is formed in the chamber 5e, and the flange 5b suppresses the friction pad 6 by the pressure. As a result, the clamp 5 fixes the pallet base 3 to the table base 1.

However, there is a problem in that the clamp 5 of the rotary table in the related art has low durability, and the friction pad 6 cannot be normally unsuppressed due to seizure. In more detail, there is a problem in that the connecting portion 5d of the clamp 5 is weak. That is, there is a problem in that the connecting portion 5d of the clamp 5 is damaged by pressure formed in the chamber 5e. In addition, there is a problem in that the seizure occurs as the flange 5b of the clamp 5 is stuck to the friction pad 6.

DOCUMENT OF RELATED ART

Patent Document

Korean Patent Application Laid-Open No. 10-2013-0014722 (Feb. 12, 2013)

SUMMARY

The present disclosure has been made in an effort to provide a rotary table which prevents seizure when a pallet base is released from a table base after the pallet base is fixed to the table base.

The present disclosure has also been made in an effort to provide a rotary table which may improve durability of a configuration that fixes a pallet base to a table base.

An exemplary embodiment of the present disclosure provides a rotary table including: a table base 10 which has a worm shaft 12; a center shaft 20 which is rotatably disposed in the table base 10; a pallet base 30 which is installed on the center shaft 20, and has a worm wheel 32 gear-engaged with the worm shaft 12; a bearing housing 40 which is installed in the table base 10, and has a first flow path 41 and a second flow path 42; a piston 70 which is installed at an outer circumferential edge of the bearing housing 40, has a first tapered portion 72 formed at an end portion of the piston 70, and is moved by hydraulic pressure provided to the first flow path 41 and the second flow path 42; and a clamp 80 which is installed in the pallet base 30, and has a second tapered portion 82 that is formed at an inner circumferential edge of the clamp 80 and repeatedly comes into close contact with the first tapered portion 72 of the piston 70 when the piston 70 reciprocally moves.

The piston 70 may further include a lug 74 which protrudes from an inner circumferential surface of the piston 70. In addition, the rotary table according to the exemplary embodiment of the present disclosure may further include a stopper 60 which is installed at an end portion of the bearing housing 40 outside the piston 70, a first chamber 91 which is formed in one side direction of the lug 74 so as to communicate with the first flow path 41, and a second chamber 92 which is formed in the other side direction of the lug 74 so as to communicate with the second flow path 42.

In the rotary table according to the exemplary embodiment of the present disclosure, the piston 70 may include a slit 76 which is formed at an end portion where the first tapered portion 72 is formed, and penetrates an inner circumferential surface and an outer circumferential surface of the piston 70.

In the rotary table according to the exemplary embodiment of the present disclosure, the plurality of slits 76 may be formed, and the plurality of slits 76 may be formed at an equal interval.

In the rotary table according to the exemplary embodiment of the present disclosure, the clamp 80 may include a groove 84 which is concavely formed in the second tapered portion 82.

According to the rotary table according to the exemplary embodiment of the present disclosure, the clamp and the piston come into contact with each other in a tapered shape, and as a result, the piston and the clamp may be easily separated when the pallet base is released, and seizure between the piston and the clamp may be inhibited.

The rotary table according to the exemplary embodiment of the present disclosure has a structure in which the clamp and the piston come into close contact with each other, instead of a structure in which the clamp is expanded by hydraulic pressure like the rotary table in the related art, thereby improving durability.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Advantages and features of the present disclosure and methods of achieving the advantages and features will be clear with reference to exemplary embodiments described in detail below together with the accompanying drawings.

Hereinafter, exemplary embodiments of the present disclosure will be described in detail with reference to the accompanying drawings. The exemplary embodiments to be described below are illustrative for helping understand the present disclosure, and it should be understood that the present disclosure may be implemented in various different ways from the exemplary embodiments described herein. However, in the description of the present disclosure, the specific descriptions and illustrations of publicly known functions or constituent elements will be omitted when it is determined that the specific descriptions may unnecessarily obscure the subject matter of the present disclosure. In addition, to help understand the present disclosure, the accompanying drawings are not illustrated based on actual scales, but parts of the constituent elements may be exaggerated in size.

Meanwhile, the terms such as "first" and "second" may be used to describe various constituent elements, but the constituent elements should not be limited by the terms. These terms are used only to distinguish one constituent element from another constituent element. For example, a first component may be named a second component, and similarly, the second component may also be named the first component, without departing from the scope of the present disclosure.

Meanwhile, the terms used in the description are defined considering the functions of the present disclosure and may vary depending on the intention or usual practice of a manufacturer. Therefore, the definitions should be made based on the entire contents of the present specification.

Like reference numerals indicate like constituent elements throughout the specification.

Figure 4:
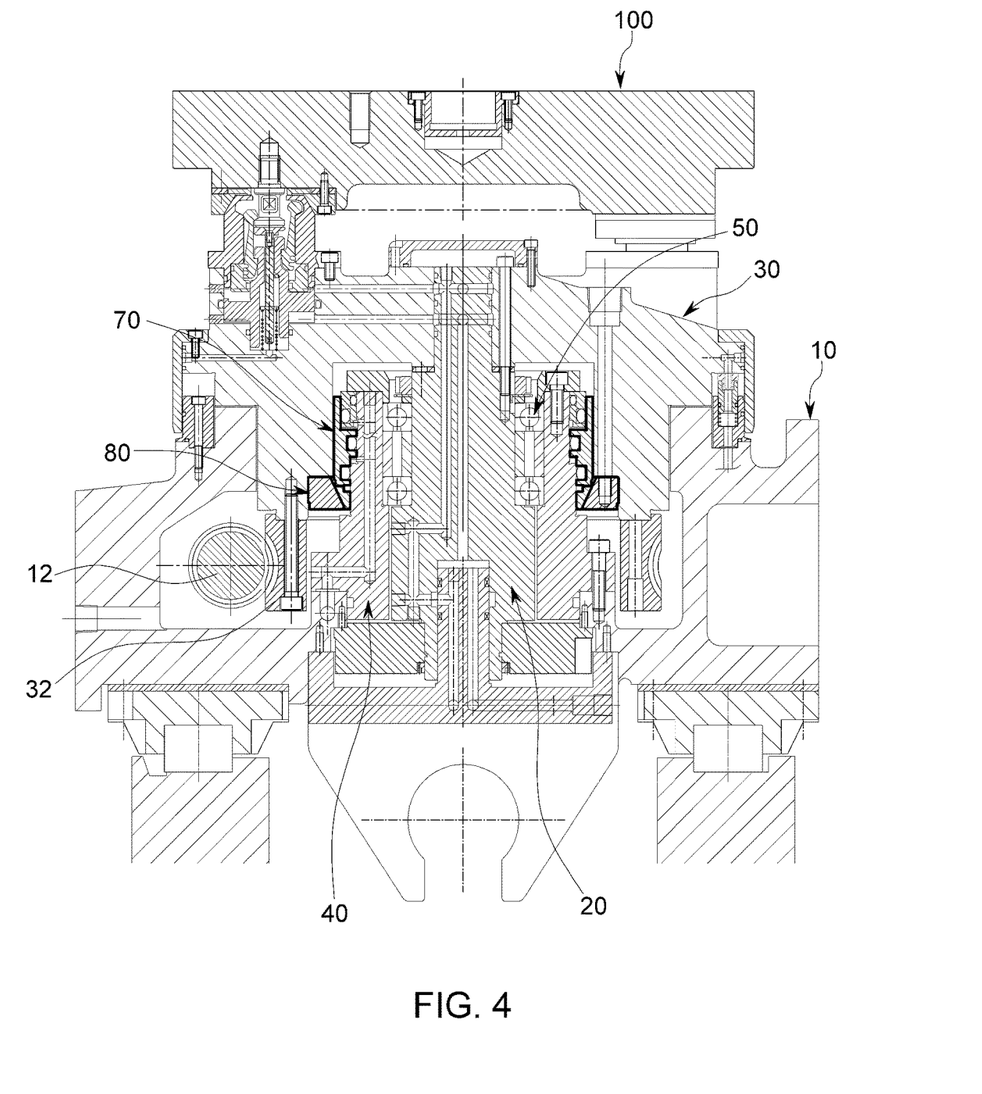
FIG. 4 is a view for explaining a rotary table according to an exemplary embodiment of the present disclosure.
Figure 5:
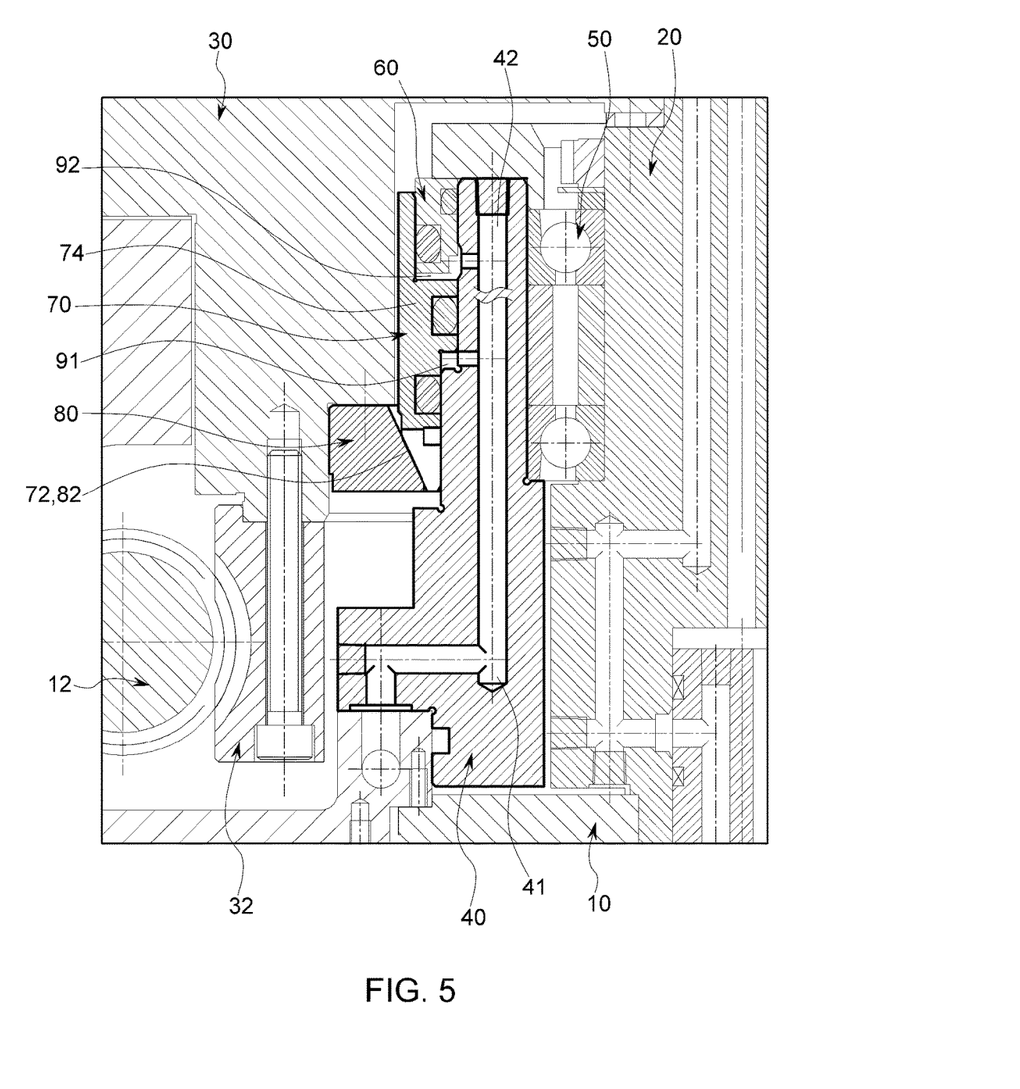
FIG. 5 is a detailed view illustrating an excerpt of a portion for implementing clamping from FIG. 4.
Figure 6:
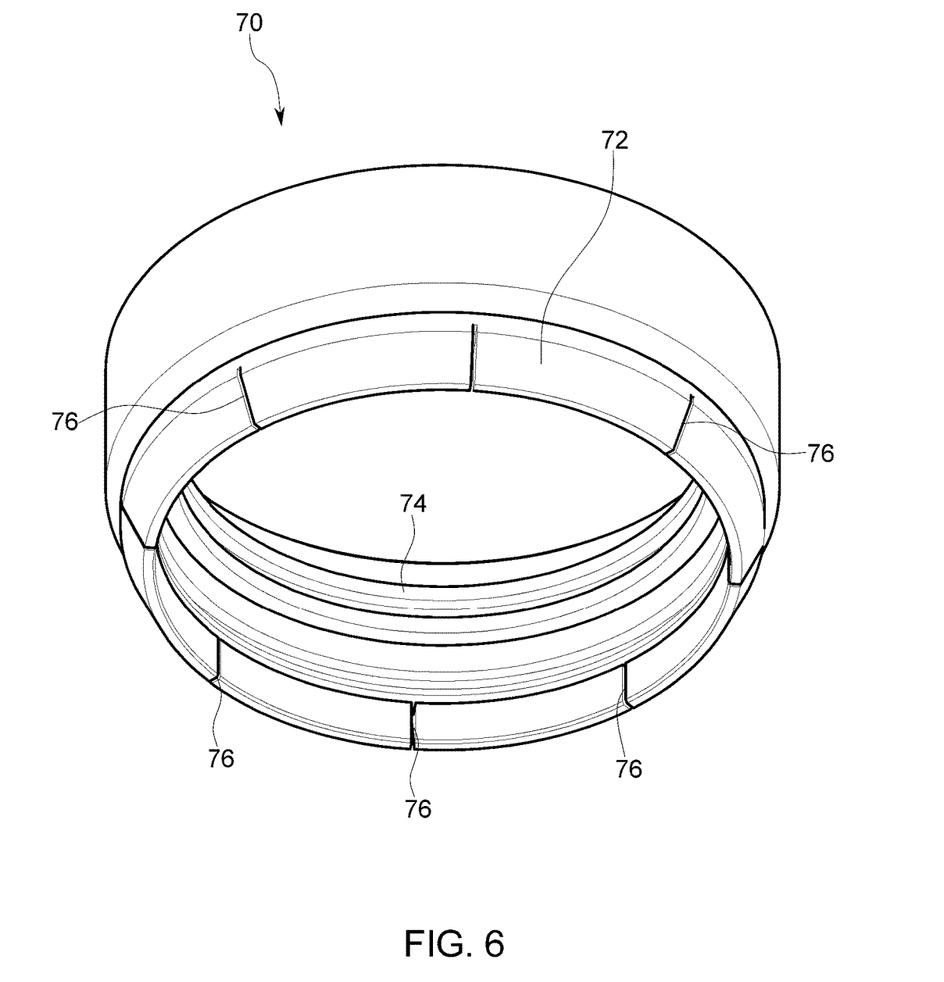
FIG. 6 is a perspective view illustrating an excerpt of a piston from the rotary table according to the exemplary embodiment of the present disclosure.
Figure 7:
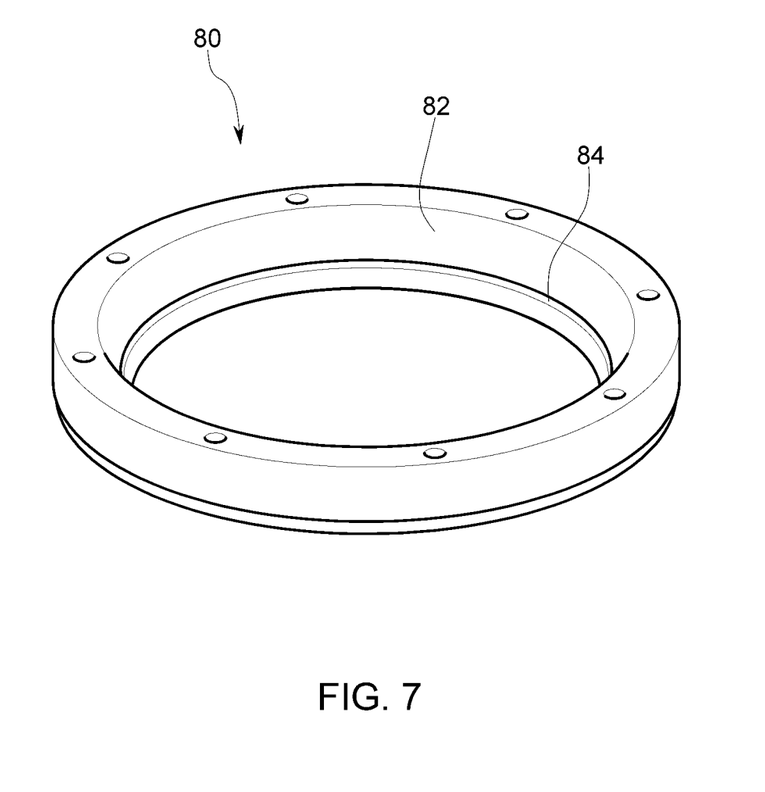
FIG. 7 is a perspective view illustrating an excerpt of a clamp from the rotary table according to the exemplary embodiment of the present disclosure.
Figure 8:
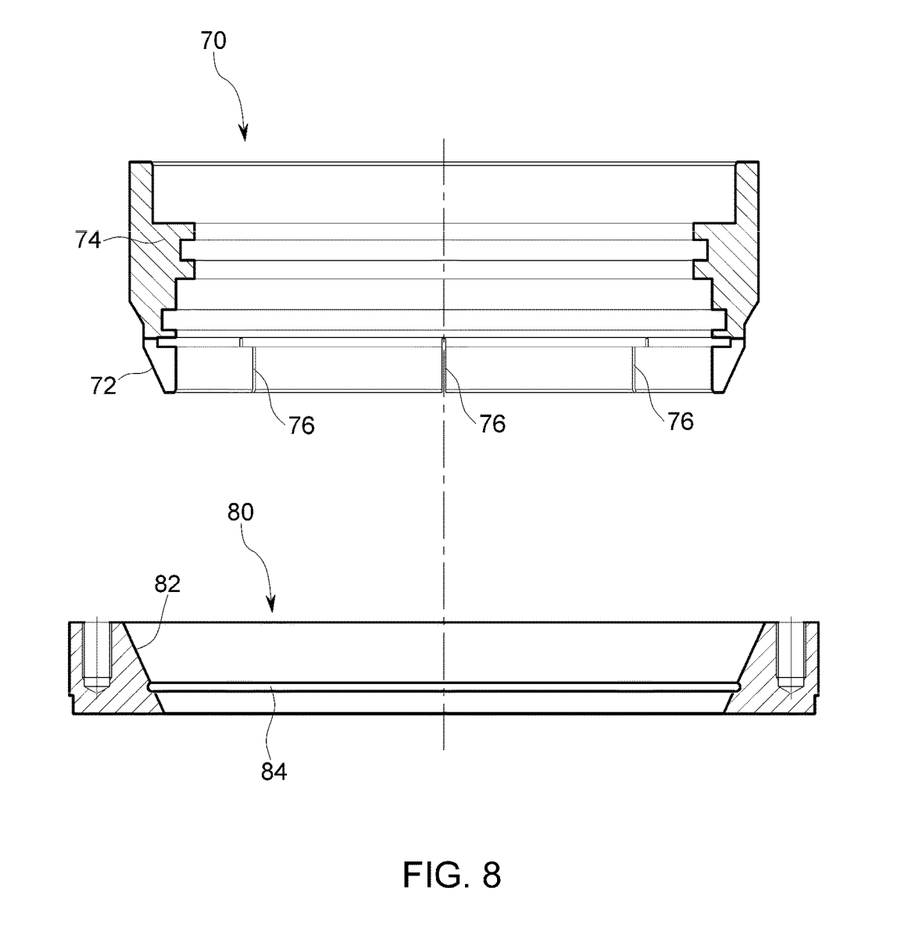
FIG. 8 is a cross-sectional view for explaining configurations of the piston and the clamp of the rotary table according to the exemplary embodiment of the present disclosure.

Hereinafter, a rotary table according to an exemplary embodiment of the present disclosure will be described with reference to FIGS. 4 to 8. FIG. 4 is a view for explaining the rotary table according to the exemplary embodiment of the present disclosure. FIG. 5 is a detailed view illustrating an excerpt of a portion for implementing clamping from FIG. 4. FIG. 6 is a perspective view illustrating an excerpt of a piston from the rotary table according to the exemplary embodiment of the present disclosure. FIG. 7 is a perspective view illustrating an excerpt of a clamp from the rotary table according to the exemplary embodiment of the present disclosure. FIG. 8 is a cross-sectional view for explaining configurations of the piston and the clamp of the rotary table according to the exemplary embodiment of the present disclosure.

The rotary table according to the exemplary embodiment of the present disclosure may include a table base 10, a center shaft 20, a pallet base 30, a bearing housing 40, a piston 70, and a clamp 80.

The table base 10 may have a worm shaft 12, the worm shaft 12 may be operated by a servo motor (not illustrated), and the servo motor may be numerically controlled. In addition, a flow path, which delivers hydraulic pressure to the bearing housing 40, may be formed in the table base 10. Further, the table base 10 may be moved on a linear motion bearing (linear motion guide) provided in a machine tool.

The center shaft 20 may be rotatably disposed in the table base 10. Further, a flow path, which delivers hydraulic pressure to the pallet base 30, may be formed in the center shaft 20.

The pallet base 30 is installed on the center shaft 20, and has a worm wheel 32. The worm wheel 32 is gear-engaged with the worm shaft 12. In addition, the pallet base 30 may have a clamping device for clamping a pallet 100.

The bearing housing 40 is installed in the table base 10, and may have a first flow path 41 and a second flow path 42. The first flow path 41 and the second flow path 42 may be connected to the flow path formed in the table base 10. Since the bearing housing 40 is installed in the table base 10, the bearing housing 40 does not rotate.

The piston 70 is installed at an outer circumferential edge of the bearing housing 40, and may have a first tapered portion 72 formed at an end portion of the piston 70. In addition, the piston 70 may be moved by hydraulic pressure provided to the first flow path 41 and the second flow path 42. In more detail, as illustrated in FIGS. 4 and 5, the piston 70 may be moved upward by hydraulic pressure provided from the first flow path 41, and may be moved downward by hydraulic pressure provided from the second flow path 42. That is, the piston 70 is reciprocally moved by hydraulic pressure provided through the first flow path 41 and the second flow path 42.

The clamp 80 is installed in the pallet base 30, and has a second tapered portion 82 formed at an inner circumferential edge of the clamp 80. When the piston 70 reaches the clamp 80, the first tapered portion 72 and the second tapered portion 82 may come into close contact with each other. On the contrary, when the piston 70 is moved away from the clamp 80, the second tapered portion 82 may be separated from the first tapered portion 72.

That is, when the piston 70 reciprocally moves, the first tapered portion 72 of the piston 70 and the second tapered portion 82 of the clamp 80 repeatedly come into close contact with each other. Further, in the rotary table according to the exemplary embodiment of the present disclosure, when the first tapered portion 72 and the second tapered portion 82 are in close contact with each other, the clamp 80 is fixed, and thus the pallet base 30 is fixed.

A bearing unit 50 may be provided between an outer circumferential edge of the center shaft 20 and an inner circumferential edge of the bearing housing 40. The bearing unit 50 may include a plurality of bearings and columns. The bearing unit 50 enables the center shaft 20 to stably rotate.

Therefore, in the rotary table according to the exemplary embodiment of the present disclosure, the worm shaft 12 is operated by an operation of the servo motor, the worm wheel 32 is rotated by the gear-engagement with the worm shaft 12, and the pallet base 30 and the pallet 100 may be rotated. A direction of the pallet 100 is changed to a particular position, and the cutting processing may be performed at the changed position. When the cutting processing is performed, the pallet 100 is not to be arbitrarily moved, and needs to be maintained at the changed position.

As described above, in the rotary table according to the exemplary embodiment of the present disclosure, the first tapered portion 72 and the second tapered portion 82 are operated to come into close contact with each other, and as a result, the pallet base 30 is fixed, and thus a rotation of the pallet 100 may be fixed.

Thereafter, when the pallet 100 is required to be rotated, hydraulic pressure is applied to the first flow path 41, such that the piston 70 is moved upward, the first tapered portion 72 and the second tapered portion 82 are separated from each other, and the pallet base 30 is released. As the pallet base 30 is released, the pallet base 30 may be freely rotated.

Therefore, in the rotary table according to the exemplary embodiment of the present disclosure, when the piston 70 is moved away from the clamp 80, the piston 70 and the clamp 80 may be easily separated from each other because of the shape characteristics of the first and second tapered portions 72 and 82, and as a result, it is possible to solve a problem of seizure in the related art.

In the rotary table according to the exemplary embodiment of the present disclosure, when the first tapered portion 72 and the second tapered portion 82 come into contact with each other, the first tapered portion 72 and the second tapered portion 82 have shapes inclined with respect to a direction in which the piston 70 moves, and as a result, a part of force applied by the piston 70 may be attenuated. That is, in the rotary table according to the exemplary embodiment of the present disclosure, force applied to the piston 70 and the clamp 80 is attenuated, thereby improving durability.

Meanwhile, the rotary table according to the exemplary embodiment of the present disclosure may further include a stopper 60 installed at an end portion of the bearing housing 40 outside the piston 70. In addition, the piston 70 may further include a lug 74 that protrudes from an inner circumferential surface of the piston 70.

The rotary table may further include a first chamber 91 which is formed in one side direction of the lug 74 so as to communicate with the first flow path 41, and a second chamber 92 which is formed in the other side direction of the lug 74 so as to communicate with the second flow path 42. Meanwhile, the stopper 60 may be disposed at the end portion of the bearing housing 40.

The first chamber 91 may be a space formed by an inner circumferential edge of the piston 70, a lower surface of the lug 74, and the bearing housing 40. That is, when hydraulic pressure is provided to the first flow path 41, the hydraulic pressure is expanded in the first chamber 91, thereby moving the piston 70 upward.

The second chamber 91 may be a space formed by the inner circumferential edge of the piston 70, an upper surface of the lug 74, a lower surface of the stopper 60, and an outer circumferential edge of the bearing housing 40. That is, when hydraulic pressure is provided to the second flow path 42, the hydraulic pressure is expanded in the second chamber 92, thereby moving the piston 70 downward.

When the piston 70 reaches an ascent limit, the stopper 60 may serve as a stopper for preventing the piston 70 from moving upward any further. In addition, the stopper 60 may absorb an impact occurring when the piston 70 reaches the ascent limit. Therefore, durability of the rotary table according to the exemplary embodiment of the present disclosure may be improved.

On the other hand, as illustrated in FIG. 6, the piston 70 of the rotary table according to the exemplary embodiment of the present disclosure may have slits 76 which are formed at an end portion where the first tapered portion 72 is formed, and penetrate an inner circumferential surface and an outer circumferential surface of the piston 70. The slit 76 may have a width of approximately 0.5 mm to 5 mm.

When the piston 70 is in close contact with the clamp 80, a minute downward displacement of the piston 70 may be slightly formed even though the piston 70 is completely in close contact with the clamp 80. In this case, the slits 76 enable the end portion of the piston 70 to be elastically deformed, and as a result, it is possible to prevent the piston 70 or the clamp 80 from being damaged.

That is, with the configuration of the slits 76, durability of the rotary table according to the exemplary embodiment of the present disclosure may be improved.

On the other hand, as illustrated in FIGS. 6 and 8, in the rotary table according to the exemplary embodiment of the present disclosure, the plurality of slits 76 may be formed, and the plurality of slits 76 may be formed at an equal interval.

Since the plurality of slits 76 is formed, the elastic deformation may be dispersed without being concentrated at a certain portion when the piston 70 comes into close contact with the clamp 80 and the end portion of the piston 70 is elastically deformed.

In particular, since the slits 76 are formed at an equal interval, stress applied to the piston 70 may become uniform, and as a result, it is possible to prevent stress from being concentrated at a certain portion of the piston 70 or the clamp 80, and thus to prevent durability of the rotary table according to the exemplary embodiment of the present disclosure from deteriorating.

On the other hand, as illustrated in FIGS. 7 and 8, the clamp 80 of the rotary table according to the exemplary embodiment of the present disclosure may include a groove 84 concavely formed in the second tapered portion 82.

The groove 84 may accommodate lubricating oil, and as a result, the piston 70 may be more easily separated from the clamp 80 when the piston 70 is separated from the clamp 80. In addition, when the pallet table 30 is rotated, the clamp 80 is rotated together with the pallet table 30. However, since the piston 70 is provided in the bearing housing 40, a rotation of the piston 70 is stopped, or the piston 70 may not freely rotate.

Therefore, when the clamp 80 is rotated, the lubricating oil accommodated in the groove 84 enables the clamp 80 to easily rotate without frictional resistance with the piston 70.

The groove 84 may receive foreign substances. For example, the foreign substances may be oil sludge or metal particles. The metal particles may be produced due to friction with other constituent elements while the piston 70 moves. The metal particles may cause scratches or breakdowns of constituent elements. However, the metal particles are naturally received by the groove 84, and as a result, it is possible to solve problems caused by foreign substances such as metal particles.

Therefore, the rotary table according to the exemplary embodiment of the present disclosure may prevent the constituent elements from being damaged due to foreign substances, thereby improving durability.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A rotary table comprising:
a table base which has a worm shaft;
a center shaft which is rotatably disposed in the table base;
a pallet base which is installed on the center shaft, and has a worm wheel gear-engaged with the worm shaft;
a bearing housing which is installed in the table base, and has a first flow path and a second flow path;
a piston which is installed at an outer circumferential edge of the bearing housing, has a first tapered portion formed at an end portion of the piston, and is moved by hydraulic pressure provided to the first flow path and the second flow path; and
a clamp which is installed in the pallet base, and has a second tapered portion that is formed at an inner circumferential edge of the clamp and repeatedly comes into close contact with the first tapered portion of the piston when the piston reciprocally moves.

2. The rotary table of claim 1, wherein the piston further includes a lug which protrudes from an inner circumferential surface of the piston, and the rotary table further includes: a stopper which is installed at an end portion of the bearing housing outside the piston, a first chamber which is formed in one side direction of the lug so as to communicate with the first flow path; and a second chamber which is formed in the other side direction of the lug so as to communicate with the second flow path.

3. The rotary table of claim 1, wherein the piston includes slits which are formed at an end portion where the first tapered portion is formed, and penetrates an inner circumferential surface and an outer circumferential surface of the piston.

4. The rotary table of claim 3, wherein the slits are formed at a plurality of locations, and at equal intervals therebetween.

5. The rotary table of claim 1, wherein the clamp includes a groove which is concavely formed in the second tapered portion.

* * * * *